United States Patent
Zecherle et al.

(10) Patent No.: US 12,012,105 B2
(45) Date of Patent: Jun. 18, 2024

(54) METHOD FOR OPERATING A MOTOR VEHICLE

(71) Applicant: AUDI AG, Ingolstadt (DE)

(72) Inventors: Andreas Zecherle, Walting (DE); Harald Hagen, Creussen (DE)

(73) Assignee: AUDI AG, Ingolstadt (DE)

( * ) Notice: Subject to any disclaimer, the term of this patent is extended or adjusted under 35 U.S.C. 154(b) by 234 days.

(21) Appl. No.: 17/642,825

(22) PCT Filed: Nov. 10, 2020

(86) PCT No.: PCT/EP2020/081564
§ 371 (c)(1),
(2) Date: Mar. 14, 2022

(87) PCT Pub. No.: WO2021/094277
PCT Pub. Date: May 20, 2021

(65) Prior Publication Data
US 2022/0379890 A1   Dec. 1, 2022

(30) Foreign Application Priority Data
Nov. 12, 2019 (DE) .......................... 102019130513.6

(51) Int. Cl.
*B60W 30/182* (2020.01)
*B60W 30/188* (2012.01)
(Continued)

(52) U.S. Cl.
CPC ........ *B60W 30/182* (2013.01); *B60W 30/188* (2013.01); *B60W 50/14* (2013.01);
(Continued)

(58) Field of Classification Search
None
See application file for complete search history.

(56) References Cited

U.S. PATENT DOCUMENTS 6,832,147 B2 * 12/2004 Vornehm .............. B60W 30/19
477/121
8,534,413 B2 * 9/2013 Nelson .............. B60W 30/1882
474/8
(Continued)

FOREIGN PATENT DOCUMENTS

AU   2012323853 A1 * 5/2014 ............ B60W 10/02
BR   112014009063 A2 * 6/2017 ............ B60W 10/02
(Continued)

OTHER PUBLICATIONS

German Examination Report issued on Mar. 20, 2020, in connection with corresponding German Application No. 102019130513.6 (12 pp., including machine-generated English translation).
(Continued)

*Primary Examiner* — Kevin R Steckbauer
(74) *Attorney, Agent, or Firm* — Maier & Maier, PLLC

(57) ABSTRACT

A method for operating a motor vehicle. The motor vehicle has a drive unit which is designed in such a way that, in case of acceleration, the motor vehicle is accelerated using a continuous torque output. The drive unit is operable in a first and second operating mode. In the first operating mode the motor vehicle is accelerated without interruption by the continuous torque output, and in the second operating mode the continuous torque output is changed over to a stepped torque output, so that in the second operating mode the motor vehicle is accelerated subject to interruption by the stepped torque output.

17 Claims, 1 Drawing Sheet

(51) Int. Cl.
*B60W 50/14* (2020.01)
*B60W 50/16* (2020.01)
*F16H 61/66* (2006.01)

(52) U.S. Cl.
CPC ....... *B60W 50/16* (2013.01); *B60W 2710/085* (2013.01); *F16H 2061/6611* (2013.01); *F16H 2061/6615* (2013.01); *F16H 2061/6616* (2013.01)

(56) References Cited

U.S. PATENT DOCUMENTS

| | | | | |
|---|---|---|---|---|
| 8,542,846 | B2 * | 9/2013 | Matejczyk | H04R 5/02 381/71.4 |
| 8,620,001 | B2 * | 12/2013 | Peachey | G10K 15/02 381/86 |
| 9,108,631 | B2 * | 8/2015 | Wang | B60W 20/30 |
| 9,151,384 | B2 * | 10/2015 | Kohler | F16H 61/66259 |
| 11,407,404 | B2 * | 8/2022 | Kaldobsky | B60K 6/445 |
| 11,813,981 | B2 * | 11/2023 | Vangelov | B60Q 5/008 |
| 11,845,460 | B2 * | 12/2023 | Oh | B60W 50/14 |
| 2002/0049118 | A1 * | 4/2002 | Vornehm | B60W 10/11 477/107 |
| 2012/0106748 | A1 * | 5/2012 | Peachey | G10K 15/04 381/61 |
| 2013/0092468 | A1 * | 4/2013 | Nelson | F16H 61/66259 474/43 |
| 2013/0096784 | A1 * | 4/2013 | Kohler | F16H 63/50 701/52 |
| 2015/0199955 | A1 * | 7/2015 | Draganic | G08B 6/00 381/86 |
| 2021/0053487 | A1 * | 2/2021 | Vangelov | B60W 50/10 |
| 2021/0206254 | A1 * | 7/2021 | Benedikt | B60K 6/36 |
| 2022/0089174 | A1 * | 3/2022 | Oh | B60W 10/08 |
| 2022/0194359 | A1 * | 6/2022 | Kaldobsky | B60K 6/445 |
| 2022/0379890 | A1 * | 12/2022 | Zecherle | B60W 30/182 |
| 2023/0016272 | A1 * | 1/2023 | Kim | B60W 50/14 |
| 2023/0356603 | A1 * | 11/2023 | Hirao | B60W 10/08 |
| 2023/0391339 | A1 * | 12/2023 | Oh | B60Q 9/00 |

FOREIGN PATENT DOCUMENTS

| | | | | |
|---|---|---|---|---|
| CA | 2851626 A1 | * | 4/2013 | ............ B60W 10/02 |
| CA | 2851626 C | * | 12/2019 | ............ B60W 10/02 |
| CN | 101398075 A | * | 4/2009 | ............ F16H 59/72 |
| CN | 101855477 A | * | 10/2010 | ........ F16H 61/0213 |
| CN | 104709276 A | * | 6/2015 | ............ B60K 6/445 |
| CN | 105026806 A | * | 11/2015 | .......... B60L 10/103 |
| CN | 103857576 B | * | 8/2017 | ............ B60W 10/02 |
| CN | 104709276 B | * | 12/2019 | ............ B60K 6/445 |
| CN | 107521499 B | * | 12/2020 | ............ B60W 10/02 |
| CN | 111365449 B | * | 4/2021 | ........ F16H 59/0204 |
| CN | 114248634 A | * | 3/2022 | ............ B60K 35/00 |
| CN | 114645940 A | * | 6/2022 | ............ B60W 10/06 |
| CN | 115610318 A | * | 1/2023 | ............ B60W 40/09 |
| CN | 117162797 A | * | 12/2023 | ............ B60W 10/08 |
| DE | 102008001805 A1 | | 11/2009 | |
| DE | 102009035779 A1 | | 2/2011 | |
| DE | 102007016420 B4 | | 4/2011 | |
| DE | 102014216678 A1 | | 3/2015 | |
| DE | 102014216678 A1 | * | 3/2015 | ........ F16H 59/0204 |
| DE | 102014225441 A1 | * | 6/2015 | ............ B60K 6/445 |
| DE | 102015226309 A1 | | 6/2017 | |
| DE | 102017221910 A1 | * | 4/2019 | ............ B60K 6/48 |
| DE | 102020121794 A1 | * | 2/2021 | ............ B60K 35/00 |
| DE | 102019130513 A1 | * | 5/2021 | ............ B60W 10/04 |
| DE | 102021201424 A1 | * | 3/2022 | ............ B60K 35/00 |
| DE | 112021004884 T5 | * | 9/2023 | ............ B60L 15/20 |
| EP | 2766238 A2 | * | 8/2014 | ............ B60W 10/02 |
| EP | 2766238 B1 | * | 1/2017 | ............ B60W 10/02 |
| EP | 3150454 A1 | * | 4/2017 | ............ B60W 10/02 |
| EP | 3150454 B1 | * | 5/2022 | ............ B60W 10/02 |
| ES | 2619684 T3 | * | 6/2017 | ............ B60W 10/02 |
| JP | S63145138 A | | 6/1988 | |
| JP | 2001082595 A | * | 3/2001 | ........ F16H 61/6648 |
| JP | 3368740 B2 | * | 1/2003 | |
| JP | 3460676 B2 | * | 10/2003 | ........ F16H 61/6648 |
| JP | 2006077857 A | * | 3/2006 | |
| JP | 4193776 B2 | * | 12/2008 | |
| JP | 20107749 A | | 1/2010 | |
| JP | 2010173389 A | * | 8/2010 | |
| JP | 2019039452 A | * | 3/2019 | ............ B60K 6/365 |
| RU | 2014119245 A | * | 11/2015 | ............ B60W 10/02 |
| WO | WO-2013056237 A2 | * | 4/2013 | ............ B60W 10/02 |
| WO | 2018110470 A1 | | 6/2018 | |
| WO | WO-2022059522 A1 | * | 3/2022 | ............ B60L 15/20 |

OTHER PUBLICATIONS

International Preliminary Report on Patentability with English translation issued on May 17, 2022, in corresponding International Application No. PCT/EP2020/081564; 16 pages.

International Search Report with English translation issued on Jan. 29, 2021, in corresponding International Application No. PCT/EP2020/081564; 4 pages.

* cited by examiner

METHOD FOR OPERATING A MOTOR VEHICLE

FIELD

The invention relates to a method for operating a motor vehicle.

BACKGROUND

The motor vehicles having internal combustion engines comprising multistage transmissions that are predominantly used today are known to display driving behavior which is distinguished in that during an acceleration process, a brief interruption of traction induced by a gear change and an acoustically perceptible signaling of the gear change resulting from the torque change occur.

In addition to a dynamic driving experience, the above effects, namely the interruption of traction and the acoustic signaling, are often perceived by the driver as an assistive aid that increases attention and thus concentration on traffic events, which has a positive effect on safety in road traffic.

In continuously variable vehicle transmissions, especially electric vehicles, which are normally equipped with only one gear stage, the above effects, namely a brief interruption in traction caused by a gear change and an acoustically perceptible signaling of the gear change, do not occur upon acceleration. The resulting reduced alertness can, under certain circumstances, result in driver fatigue, which in turn has a negative effect on safety and road traffic.

DE 10 2009 035 779 A1 discloses a method for operating a transmission, in particular a power-split hybrid transmission for a vehicle, in particular a hybrid vehicle. The method permits a simulation of operation of the transmission having a continuously variable transmission ratio as a conventional automatic transmission. This gives a driver of the vehicle a pleasant driving experience that is familiar from conventional transmissions.

Further methods for operating a motor vehicle can be found in DE 10 2014 216 678 A1, DE 10 2007 016 420 B4, and DE 10 2008 001 805 A1.

SUMMARY

The invention is based on the object of specifying a method for operating a motor vehicle, which has a drive unit with an uninterrupted torque output, by means of which the risk of driver fatigue is reduced.

According to the method according to the invention, it is provided that the drive unit can be operated in a first and second operating mode, wherein in the first operating mode the motor vehicle is accelerated without interruption by means of the stepless torque output, and in the second operating mode the continuous torque output is converted into a stepped torque output, so that in second operating mode, the motor vehicle is accelerated subject to interruption by means of the stepped torque output.

Solely for the sake of completeness, it is to be noted that uninterrupted acceleration of the motor vehicle is to be understood to mean that—when shown in an acceleration curve diagram in which the torque (y axis) is plotted over the velocity (x axis), the acceleration curve has a continuous (unstepped) course. Correspondingly, an acceleration subject to interruptions is to be understood as meaning that the acceleration curve has a discontinuous (stepped) course.

A motor vehicle which has a drive unit having an uninterrupted torque output is to be understood hereinafter in particular as an electric vehicle or a vehicle having a continuously variable automatic transmission.

The method according to the invention now ensures that when the motor vehicle is operated in the second operating mode, when the motor vehicle is accelerated, interruptions in the traction perceptible by the driver and an acoustic effect resulting from the change in torque occur. The perceptible interruptions in traction and the acoustic effect that occurs have a positive effect on the attention of the driver, i.e., the fatigue effect is reduced, which has a positive effect on safety and road traffic. Another advantage is that switching between the two operating modes makes it easier for potential new customers to switch to electric vehicles.

In order to enable a change of the operating modes that is easy to carry out, namely from the first operating mode to the second operating mode or from the second operating mode to the first operating mode, the changeover is preferably carried out after an easily executable manual confirmation of an actuating element provided for this purpose.

The actuating element can be a shift paddle arranged on the steering wheel, for example. It is preferably provided that the number n of the desired interruptions can be set in the second operating mode. This means that any desired gear-gear change simulation can be made available and thus "shifting without shifting" can be generated. For example, by selecting n=4, a four-stage transmission can be simulated.

In addition, the torque reduction resulting from an interruption, in other words the strength of the torque reduction $\Delta M$, is preferably settable in the second operating mode.

A further preferred embodiment is distinguished in that the duration t of the interruptions can also be set in the second operating mode. The setting of the duration of the interruptions in combination with the number of interruptions and the strength of the torque reduction enables a realistic simulation adapted to specific needs in the second operating mode. It is particularly advantageously provided that for various modes, such as a sport mode, a comfort mode etc., in which corresponding values for the number n of interruptions, the strength of the torque reduction $\Delta M$ in the event of an interruption and the duration t of an interruption, are preset and can be selected accordingly In the second operating mode, an additional acoustic signal is preferably generated in the event of an interruption in the torque output. Since an interruption in the torque output is now perceptible due to the interruption of traction, the acoustic effect resulting from the change in torque, and also the additional acoustic signal generated, particularly increased attention of the driver is ensured in an advantageous manner, which also counteracts driver fatigue.

It is preferably provided that the output of the acoustic signal is activatable or deactivatable. This enables individualization adapted to the needs of the driver.

A further individualization adapted to the needs of the driver is enabled in that the type of acoustic signal to be emitted can be selected from a list of predefined signals/noises. In addition to a shifting noise that is based on a "normal shifting process" as an acoustic signal, the list includes other signal tones or signal noises that can be selected accordingly.

The number of desired interruptions in the torque output, the duration of an interruption in a torque output, the selection of the type of the acoustic signal, and the activation/deactivation of the output of the acoustic signal are preferably input by means of an infotainment system of the motor vehicle. Since corresponding infotainment systems for the central control of radio, navigation, multimedia and comfort and safety functions are installed as standard features in current motor vehicles, the above parameters can be input or set with little effort.

Further advantages and possible applications of the present invention result from the following description in conjunction with the exemplary embodiment depicted in the drawing.

DETAILED DESCRIPTION

Figure 1:
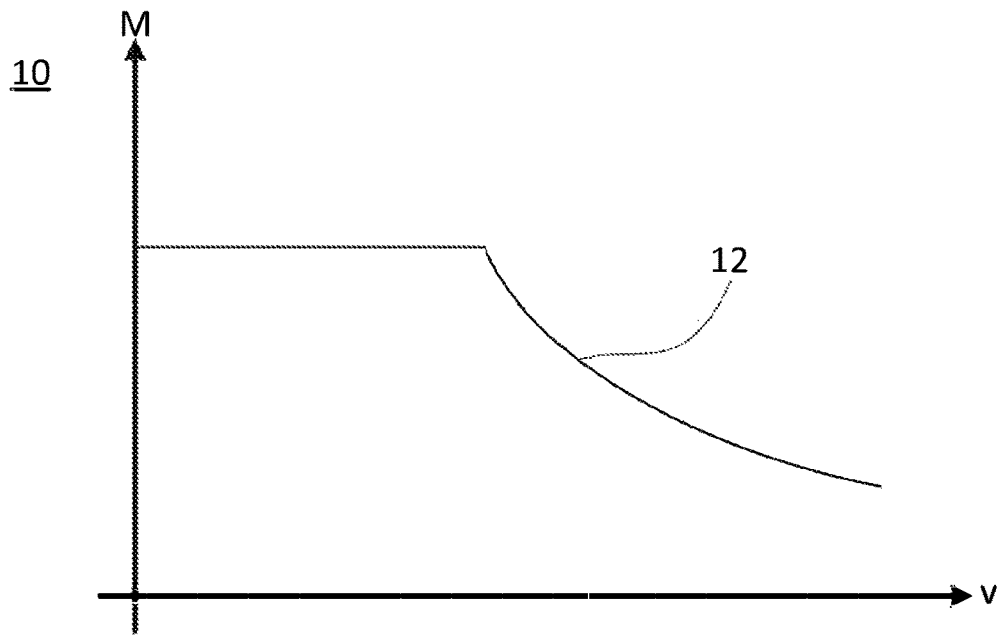
FIG. 1 shows an acceleration curve diagram in which the acceleration of the motor vehicle in the first operating mode is shown.
Figure 2:
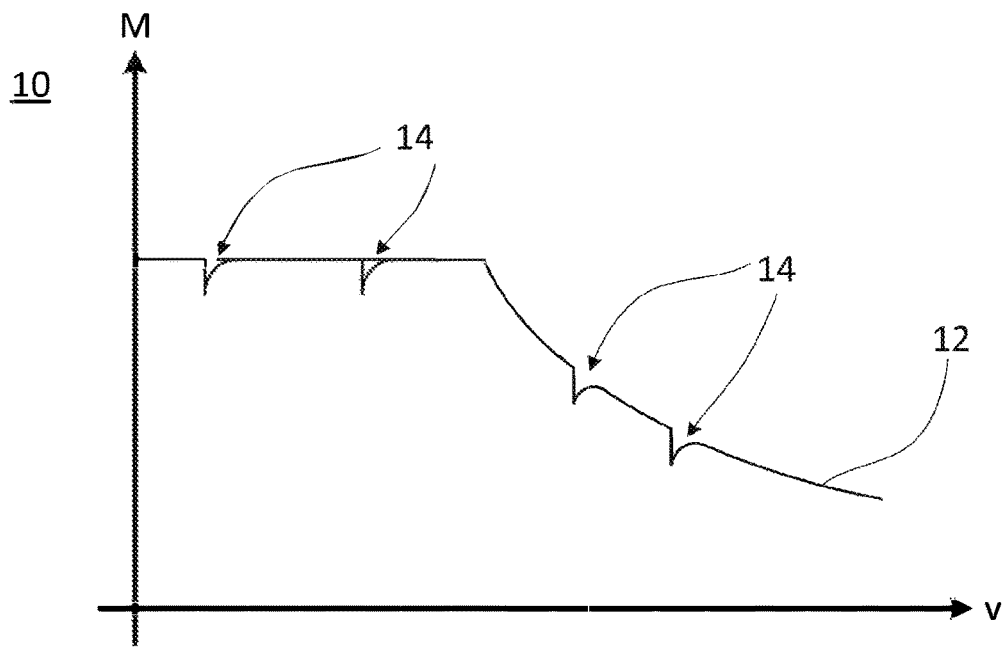
FIG. 2 shows a further acceleration curve diagram in which the motor vehicle is accelerated according to the second operating mode.

FIGS. 1 and 2 show an acceleration curve diagram designated as a whole by the reference numeral 10. The acceleration curve shown is designated by the reference numeral 12. As FIG. 1 and FIG. 2 show, the velocity v of the motor vehicle is plotted on the x axis and the torque M is plotted on the y axis.

In the present case, the motor vehicle is a gearless electric vehicle, i.e., there is no gear change when the motor vehicle is accelerated.

As can be clearly seen in FIG. 1, the acceleration curve 12 of the gearless electric vehicle has an uninterrupted, i.e., in the mathematical sense, continuous curve profile. This uninterrupted curve profile represents the first operating mode.

According to the method, it is provided that the motor vehicle can also be operated in a second operating mode. This second operating mode is shown in FIG. 2.

As can be seen from FIG. 2, in the second operating mode, the acceleration curve 12 has a stepped or discontinuous curve profile. In the present case, the acceleration curve 12 has n=4 interruptions. The interruptions are also denoted by the reference numeral 14 hereinafter. This means that when accelerating, a brief reduction in torque occurs four times, resulting in an interruption in traction perceptible to the driver. The interruption interaction in combination with the acoustic effect that occurs due to the change in torque has a positive effect on the attention of the driver, since this also reduces the fatigue effect in particular, which in turn has a positive effect on safety in road traffic.

In the present case, it is also provided that, in addition to the acoustic effect that occurs due to the change in torque, an additional acoustic signal is also generated and output upon each interruption. As a result, the above-mentioned advantage, namely the increase in the attention of the driver, is additionally strengthened.

Figure 3:
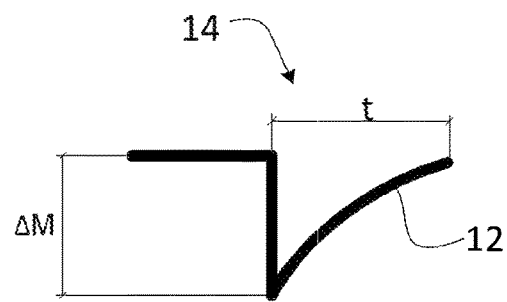
FIG. 3 shows an enlarged detail from the acceleration curve diagram from FIG. 2.

It is particularly preferred that both the number n of interruptions and the strength ΔM of the torque reduction in the event of an interruption, as well as the duration t of an interruption are freely settable. The above parameters, intensity ΔM of the torque reduction, and duration t of an interruption, can be seen from FIG. 3.

The invention claimed is:

1. A method for operating a motor vehicle, wherein the motor vehicle has a drive unit configured to operate in both a first operating mode and a second operating mode, the method comprising:

presenting, to a driver, a list of predefined sounds, wherein the driver selects a type of acoustic sound from the list of predefined sounds as a selected sound;

in the first operating mode, accelerating the motor vehicle without interruption by a continuous torque output; and in the second operating mode, changing the continuous torque output over to a stepped torque output, so that acceleration of the motor vehicle is subject to interruption by the stepped torque output and the selected sound is emitted during the interruption.

2. The method as claimed in claim 1, further comprising:
switching between the first operating mode and the second operating mode after actuation of an actuating element.

3. The method as claimed in claim 1, further comprising:
in the second operating mode, setting the torque output subject to interruptions with regard to a number (n) of interruptions.

4. The method as claimed in claim 1, further comprising:
in the second operating mode, setting the torque output subject to interruptions with regard to a strength of a torque reduction (ΔM) after the interruptions.

5. The method as claimed in claim 1, further comprising:
in the second operating mode, setting the torque output subject to interruptions with regard to a duration (t) of an interruption.

6. The method as claimed in claim 1, further comprising:
in the second operating mode, generating an acoustic signal after an interruption in the torque output.

7. The method as claimed in claim 6, further comprising:
activating an output of the acoustic signal.

8. The method as claimed in claim 3, further comprising:
performing the selection of the type of acoustic sound from the list of predefined sounds as the selected sound in an infotainment system of the motor vehicle.

9. The method as claimed in claim 2, further comprising:
wherein in the second operating mode, setting the torque output subject to interruptions with regard to a number (n) of interruptions.

10. The method as claimed in claim 3, further comprising:
wherein in the second operating mode, setting the torque output subject to interruptions with regard to a strength of a torque reduction (ΔM) after the interruptions an interruption.

11. The method as claimed in claim 2, further comprising:
wherein in the second operating mode, setting the torque output subject to interruptions with regard to a duration (t) of an interruption.

12. The method as claimed in claim 3, further comprising:
wherein in the second operating mode, setting the torque output subject to interruptions with regard to a duration (t) of an interruption.

13. The method as claimed in claim 4, further comprising:
wherein in the second operating mode, setting the torque output subject to interruptions with regard to a duration (t) of an interruption.

14. The method as claimed in claim 2, further comprising:
wherein in the second operating mode, generating an acoustic signal in the event of an interruption in the torque output.

15. The method as claimed in claim 3, further comprising:
wherein in the second operating mode, generating an acoustic signal in the event of an interruption in the torque output.

16. The method as claimed in claim 4, further comprising:
wherein in the second operating mode, generating an acoustic signal in the event of an interruption in the torque output.

17. The method as claimed in claim 5, further comprising:
wherein in the second operating mode, generating an acoustic signal in the event of an interruption in the torque output.

\* \* \* \* \*